(12) United States Patent
Kimura et al.

(10) Patent No.: US 12,536,421 B2
(45) Date of Patent: Jan. 27, 2026

(54) NEURAL NETWORK

(71) Applicants: Ryukoku University, Kyoto (JP); ROHM CO., LTD., Kyoto (JP)

(72) Inventors: Mutsumi Kimura, Otsu (JP); Isato Ogawa, Otsu (JP); Yoshinori Miyamae, Kyoto (JP)

(73) Assignees: RYUKOKU UNIVERSITY, Kyoto (JP); ROHM CO., LTD., Kyoto (JP)

( * ) Notice: Subject to any disclaimer, the term of this patent is extended or adjusted under 35 U.S.C. 154(b) by 1095 days.

(21) Appl. No.: 17/537,217

(22) Filed: Nov. 29, 2021

(65) Prior Publication Data

US 2022/0172034 A1    Jun. 2, 2022

(30) Foreign Application Priority Data

Nov. 30, 2020    (JP) ................. 2020-197991

(51) Int. Cl.
     *G11C 16/04*    (2006.01)
     *G06N 3/063*    (2023.01)
     *G06N 3/08*    (2023.01)

(52) U.S. Cl.
     CPC .............. *G06N 3/063* (2013.01); *G06N 3/08* (2013.01)

(58) Field of Classification Search
     CPC ................. G06N 3/063; G06N 3/08
     See application file for complete search history.

(56) References Cited

U.S. PATENT DOCUMENTS

| | | | |
|---|---|---|---|
| 10,217,046 B2 * | 2/2019 | Eleftheriou ............ | G06N 3/065 |
| 11,625,588 B2 * | 4/2023 | Hou ................... | G11C 13/0004 706/41 |
| 12,056,602 B2 * | 8/2024 | Yang ................. | G06N 3/065 |
| 2021/0026601 A1 | 1/2021 | Kobayashi et al. | |
| 2021/0036223 A1 | 2/2021 | Kimura et al. | |

FOREIGN PATENT DOCUMENTS

| | | |
|---|---|---|
| JP | 2019179499 A | 10/2019 |
| WO | 2019078367 A1 | 4/2019 |

OTHER PUBLICATIONS

Japanese Office Action dated Jul. 2, 2024, in the counterpart Japanese Patent Application No. 2020-197991.
Yuta Miyabe et al., "Neural network using Bi3.25La0.75Ti3O12 thin film for synapse", Proceedings of Workshop of the Institute of Image Information and Television Engineers, vol. 42 No. 45, Japan, The Institute of Image Information and Television Engineers, Dec. 18, 2018, pp. 53-56.

* cited by examiner

*Primary Examiner* — Pho M Luu
(74) *Attorney, Agent, or Firm* — Rabin & Berdo, P.C.

(57) ABSTRACT

A neural network includes first electrode lines in parallel, second electrode lines in parallel, a ferroelectric layer, neuron circuits, a first direction control circuit, and a second direction control circuit. The second electrode lines extend in a direction different from the first electrode lines. The ferroelectric layer is arranged between the first electrode lines and the second electrode lines. The neuron circuits are provided in the first electrode lines, respectively. The first direction control circuit is connected between the neuron circuits and the first electrode lines. The second direction control circuit is connected between the neuron circuits and the second electrode lines. The first electrode lines and the second electrode lines are capacitively coupled to form synapse devices at intersections in a plan view, each of the intersections being a portion where a first electrode line and a second electrode line intersect with each other.

16 Claims, 8 Drawing Sheets

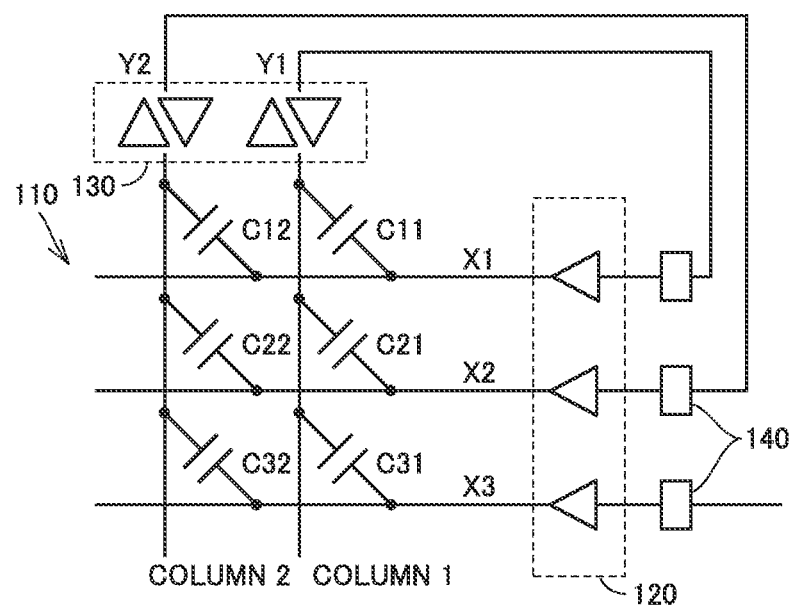

| C12 | C11 |
|---|---|
| — | High |
| C22 | C21 |
| — | High |
| C32 | C31 |
| — | High |

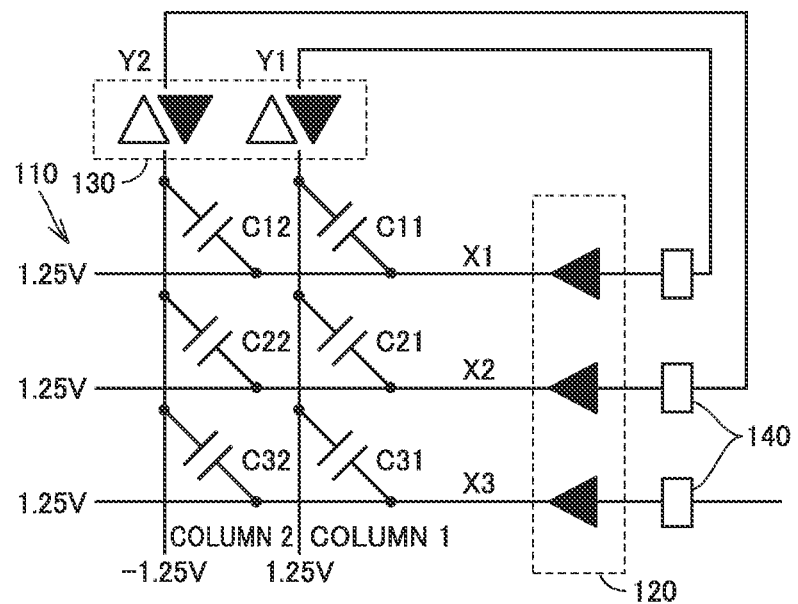

$Qout1 = C11 \times VX1 + C21 \times VX2 + C31 \times VX3$ $Vout1 = Qout1/(C11+C21+C31)$ $Qout2 = C12 \times VX1 + C22 \times VX2 + C32 \times VX3$ $Vout2 = Qout2/(C12+C22+C32)$

NEURAL NETWORK

BACKGROUND OF THE INVENTION

Field of the Invention

The present disclosure relates to a neural network and more particularly to a technique for lowering power consumption in a hardware neural network.

Description of the Background Art

Research and development of artificial intelligence has currently actively been conducted, and artificial intelligence has also been put into practical use. In connection with artificial intelligence, a neural network, most notably deep learning, has widely been known. Most of conventional neural networks have been realized as software executed by ultra-high performance large-scale computers.

Research and development of compact hardware neural networks has also been conducted. The neural networks can be realized by highly integrating neuron circuits that mimic the structure of a brain with synapse devices. Among hardware neural networks, a neural network in which synapse devices are arranged in matrix and neuron circuits are coupled to one another through the synapse devices has been known. According to such a configuration, a compact hardware neural network can be realized.

For example, WO2019/078367 discloses a configuration in which memristors used as synapse devices are arranged in matrix. The memristor can function as a variable resistance element that has a binary resistance value by application of a voltage higher than a read voltage. Japanese Patent Laying-Open No. 2019-179499 discloses a configuration in which synapse devices including ferroelectric transistors are arranged in matrix. In the ferroelectric transistors in Japanese Patent Laying-Open No. 2019-179499, a gate insulating film is formed of a ferroelectric material. A binary threshold value can be set for the transistor by polarization of the ferroelectric material of the gate insulating film, so that the transistor can function as the variable resistance element.

SUMMARY OF THE INVENTION

When the synapse devices are implemented by variable resistance elements as in WO2019/078367 and Japanese Patent Laying-Open No. 2019-179499, a current should steadily be fed to the synapse devices in storing (training) and reading (retrieving) data. Therefore, in particular when the number of synapse devices increases for high integration, power consumption may increase.

The present disclosure was made to solve such a problem, and an object thereof is to lower power consumption in a hardware neural network.

A neural network according to the present disclosure includes first electrode lines in parallel, second electrode lines in parallel, a ferroelectric layer, neuron circuits, and a first direction control circuit and a second direction control circuit. The second electrode lines extend in a direction different from the first electrode lines. The ferroelectric layer is arranged between the first electrode lines and the second electrode lines. The neuron circuits are provided in the first electrode lines, respectively. The first direction control circuit is connected between the neuron circuits and the first electrode lines. The second direction control circuit is connected between the neuron circuits and the second electrode lines. The first electrode lines and the second electrode lines are capacitively coupled to form synapse devices at intersections in a plan view, each of the intersections being a portion where a first electrode line and a second electrode line intersect with each other.

The neural network is capable of training a provided signal and retrieving a trained signal. Each of the neuron circuits is configured to provide a signal in a first state or a second state in accordance with an input. In training, the first direction control circuit and the second direction control circuit set capacitances of the synapse devices by applying to the first electrode lines and the second electrode lines, voltages different in accordance with states of output signals from the neuron circuits.

In retrieval, the first direction control circuit applies a voltage lower than in training to the first electrode lines, and the second electrode lines provide voltages weighted in accordance with the capacitances of the synapse devices set in training.

In training, the first direction control circuit and the second direction control circuit (i) apply, when outputs from the neuron circuits are in the first state, a voltage to the first electrode lines and the second electrode lines so as to apply a first voltage to the synapse devices, and (ii) apply, when outputs from the neuron circuits are in the second state, a voltage to the first electrode lines and the second electrode lines so as to apply a second voltage lower than the first voltage to the synapse devices. In the synapse devices, a capacitance when the first voltage is applied is different from a capacitance when the second voltage is applied.

In retrieval, the first direction control circuit applies a third voltage lower than the first voltage and the second voltage to the first electrode lines.

The third voltage has a voltage value at a level at which the capacitances of the synapse devices are not varied.

Each of the first electrode lines is formed of platinum or silicide of platinum. Each of the second electrode lines is formed of gold or silicide of gold.

Each of the first electrode lines is formed of gold or silicide of gold. Each of the second electrode lines is formed of platinum or silicide of platinum.

The ferroelectric layer contains bismuth lanthanum titanate, lead zirconate titanate, or barium titanate.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are a first diagram for illustrating an approach to training and retrieval in the neural network in FIG. 1.

FIGS. 9A and 9B are a third diagram for illustrating an approach to training and retrieval in the neural network in FIG. 1.

DESCRIPTION OF THE PREFERRED EMBODIMENTS

Figure 1:
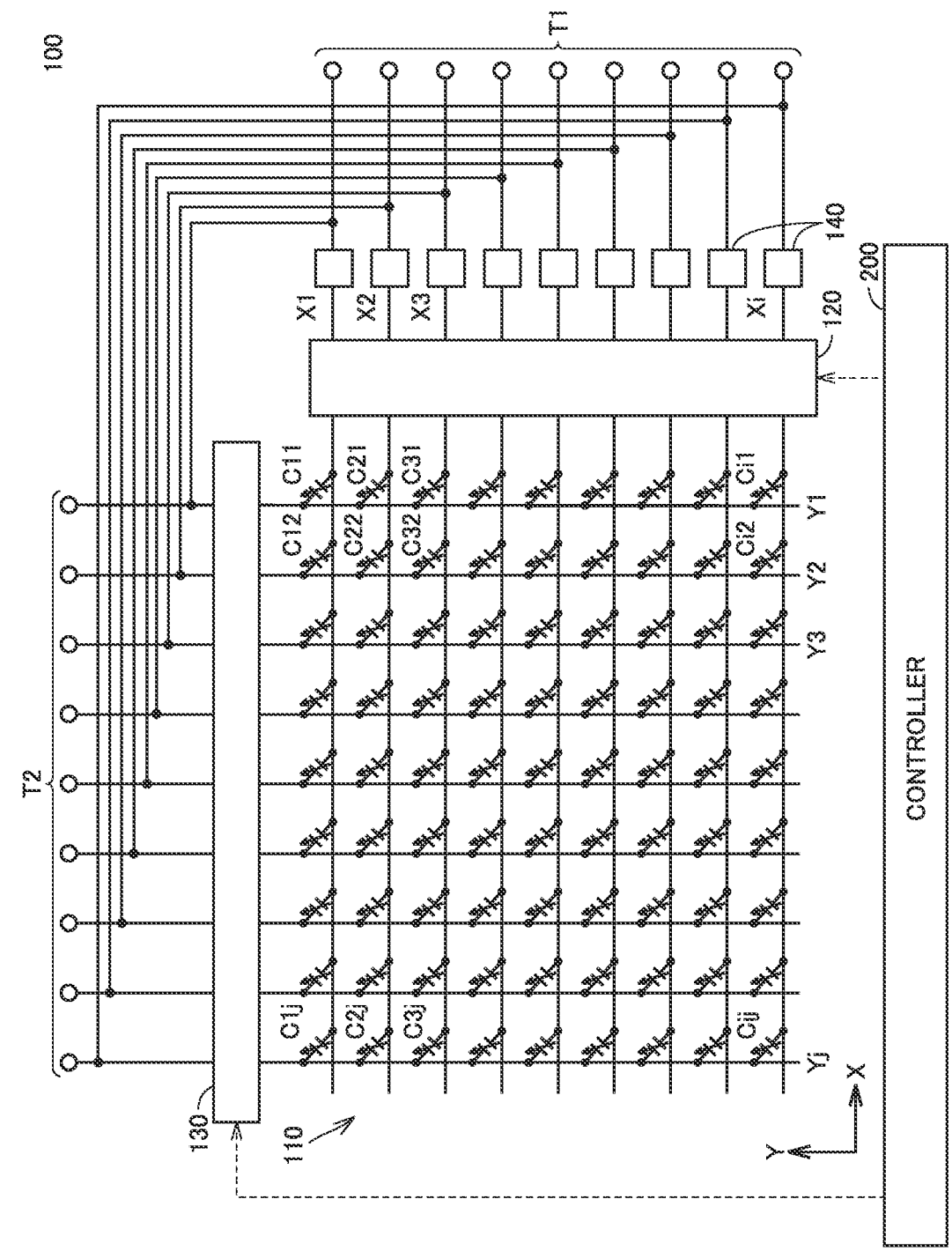
FIG. 1 is a circuit diagram schematically showing a neural network according to the present embodiment.

An embodiment of the present disclosure will be described in detail below with reference to the drawings. The same or corresponding elements in the drawings have the same reference characters allotted and description thereof will not be repeated.

Configuration of Neural Network

FIG. 1 is a circuit diagram schematically showing a neural network 100 according to the present embodiment. Referring to FIG. 1, neural network 100 includes input terminals T1, output terminals T2, a capacitor array 110, direction control circuits 120 and 130, a plurality of neuron circuits 140, and a controller 200. Direction control circuits 120 and 130 correspond to the "first direction control circuit" and the "second direction control circuit" in the present disclosure, respectively.

Capacitor array 110 includes first electrode lines X1 to Xi arranged in parallel, second electrode lines Y1 to Yj arranged in parallel, and a ferroelectric layer (not shown) arranged between first electrode lines X1 to Xi and second electrode lines Y1 to Yj. First electrode lines X1 to Xi extend in a first direction (a direction of an X axis in FIG. 1). Each of first electrode lines X1 to Xi is connected to corresponding input terminal T1. Second electrode lines Y1 to Yj extend in a second direction (a direction of a Y axis in FIG. 1) orthogonal to the first direction. Each of second electrode lines Y1 to Yj is connected to corresponding output terminal T2. Second electrode lines Y1 to Yj (that is, output terminals T2) are connected to first electrode lines X1 to Xi (that is, input terminals T1), respectively. Signals provided from second electrode lines Y1 to Yj are configured to be fed back to first electrode lines X1 to Xi through neuron circuits 140.

As will be described later with reference to FIG. 2, the ferroelectric layer forms a capacitor in a portion where a first electrode line and a second electrode line intersect with each other. In other words, capacitor array 110 is configured such that a plurality of ferroelectric capacitors C11 to Cij are arranged in matrix. Each of ferroelectric capacitors C11 to Cij in capacitor array 110 functions as a synapse device in the neural network.

Neuron circuit 140 is provided for each of first electrode lines X1 to Xi. Neuron circuit 140 is configured to receive a signal from input terminal T1 and/or a signal fed back from a corresponding one of second electrode lines Y1 to Yj, and to provide a High signal when a level of the signal is equal to or higher than a prescribed threshold value and to provide a Low signal when the level is lower than the threshold value.

Direction control circuit 120 is connected between neuron circuits 140 and first electrode lines X1 to Xi. Direction control circuit 130 is connected between neuron circuits 140 and second electrode lines Y1 to Yj. Direction control circuits 120 and 130 are configured to adjust a voltage to be applied to each electrode line based on an instruction from controller 200. Direction control circuits 120 and 130 are configured to switch between connection and disconnection between neuron circuit 140 and each electrode line. As will be described later, storage (training) of data in capacitor array 110 and reading (retrieval) of trained data can be done by controlling direction control circuits 120 and 130.

Controller 200 includes, for example, a CPU and a memory (neither of which is shown), and controls direction control circuits 120 and 130 based on signals provided from neuron circuits 140. Functions of controller 200 may be performed by direction control circuits 120 and 130.

Generally, in setting capacitances of ferroelectric capacitors C11 to Cij in training, direction control circuits 120 and 130 apply voltages to first electrode lines X1 to Xi and second electrode lines Y1 to Yj such that a prescribed potential difference is produced between opposing ends of a target ferroelectric capacitor. As will be described later with reference to FIGS. 4 (FIGS. 4A to 4C) and 5, different data is set as a difference in capacitance in the ferroelectric capacitor in accordance with a voltage applied across opposing ends of the ferroelectric capacitor. The capacitances of ferroelectric capacitors C11 to Cij are thus trained.

In retrieval of the trained data, direction control circuit 120 applies a voltage lower than the voltage in training to first electrode lines X1 to Xi in accordance with an output signal from neuron circuit 140 corresponding to the signal provided to input terminal T1. A signal obtained by weighted addition with the capacitance of the ferroelectric capacitor connected to each second electrode line being defined as a weight is provided from each of second electrode lines Y1 to Yj.

In retrieval, the obtained signals provided from second electrode lines Y1 to Yj are fed back to neuron circuits 140 in corresponding first electrode lines X1 to Xi. As set forth above, the fed back signal is a signal obtained by weighted addition with the capacitance of the ferroelectric capacitor connected to the second electrode line being defined as the weight. Therefore, in a specific first electrode line, a value provided from input terminal T1 may be different from a value of the fed back signal. Then, a signal provided from neuron circuit 140 is varied from a state before feedback. In other words, inference is made based on a state of the input signal in another first electrode line, and a voltage to be applied to the first electrode line is varied.

In training, neural network 100 thus trains the capacitor (that is, a coupling coefficient) in capacitor array 110 to have an appropriate value by correcting the capacitance of each ferroelectric capacitor with training data. Then, in retrieval, a correct output can be obtained by making inference for new data (for example, a pixel value of image data) provided from input terminal T1 by using the trained coupling coefficient.

Configuration of Ferroelectric Capacitor

Figure 2:
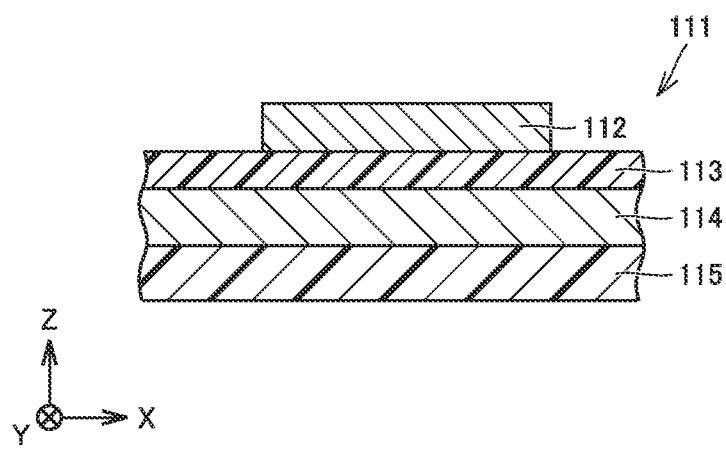
FIG. 2 is a cross-sectional view showing a structure of a ferroelectric capacitor that forms a synapse device.
Figure 3:
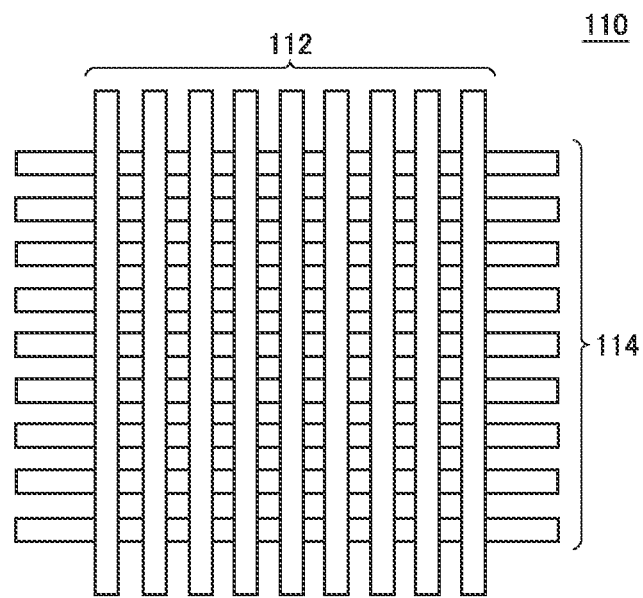
FIG. 3 is a plan view showing a ferroelectric capacitor array in FIG. 1.

FIG. 2 is a cross-sectional view showing a structure of a ferroelectric capacitor 111 (which is also simply referred to as a "capacitor" below) that forms a synapse device in capacitor array 110 in FIG. 1. FIG. 3 is a plan view showing capacitor array 110 in FIG. 1.

Referring to FIGS. 2 and 3, capacitor 111 includes a first electrode 114 (corresponding to first electrode lines X1 to Xi), a second electrode 112 (corresponding to second electrode lines Y1 to Yj), a ferroelectric layer 113 arranged between first electrode 114 and second electrode 112, and a support substrate 115 as shown in FIG. 1.

Support substrate 115 is formed from a flexible substrate such as a resin substrate, a glass substrate, or a polyethylene naphthalate film. First electrode 114, ferroelectric layer 113, and second electrode 112 are arranged on support substrate 115 in this order. Second electrode 112, ferroelectric layer 113, and first electrode 114 may be formed on support substrate 115 in this order.

First electrode 114 is formed of platinum Pt and second electrode 112 is formed of gold Au. In contrast, first electrode 114 may be formed of gold and second electrode 112 may be formed of platinum. Each electrode may be composed of silicide containing the metal above. First electrode 114 and second electrode 112 are deposited by vapor deposition or sputtering, and thereafter patterned into a required shape. Each of first electrode 114 and second electrode 112 may be formed as being multi-layered. Bismuth lanthanum titanate (BLT), lead zirconate titanate (PZT), or barium titanate ($BaTiO_3$) is used for ferroelectric layer 113.

In capacitor 111, when a positive voltage not lower than a prescribed level or a negative voltage not higher than a prescribed level with respect to first electrode 114 is applied to second electrode 112, polarization occurs in ferroelectric layer 113 and a capacitance is induced. As will be described later with reference to FIG. 4, even when an applied voltage is thereafter set to a voltage around zero, the induced capacitance remains (which is also referred to as a "residual capacitance" below). The residual capacitance holds a different state in correspondence with magnitude of a voltage (a potential difference) applied across opposing ends of the capacitor.

Specifically, when application of a relatively high voltage across first electrode 114 and second electrode 112 corresponds to High (a first state) of data, the residual capacitance is high. On the other hand, when application of a relatively low voltage across first electrode 114 and second electrode 112 corresponds to Low (a second state) of data, the residual capacitance is low. The state of the data can thus be stored (trained) as magnitude of the residual capacitance. In reading (retrieving) trained data, a voltage weighted in accordance with the residual capacitance is provided from second electrode 112 by applying a voltage at such a level as not varying the residual capacitance of capacitor 111 to first electrode 114. Application of a relatively high voltage across first electrode 114 and second electrode 112 may be brought in correspondence with Low of data and application of a relatively low voltage across first electrode 114 and second electrode 112 may be brought in correspondence with High of data.

Characteristics of Ferroelectric Capacitor

Figure 4A:
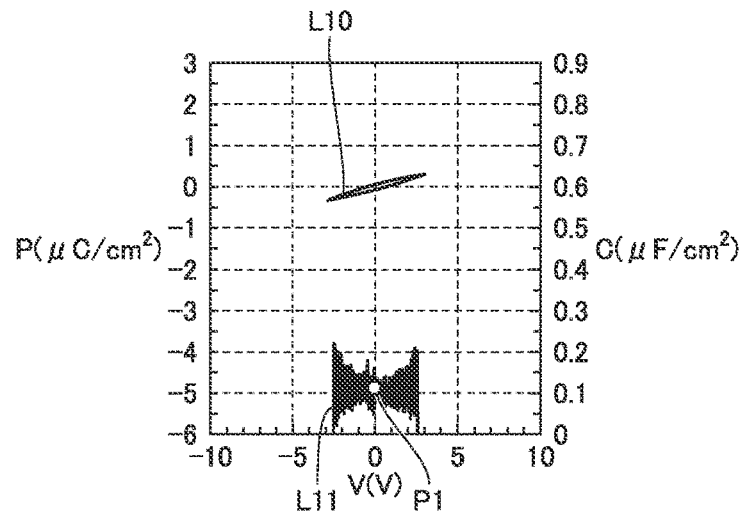
FIGS. 4A to 4C are characteristic diagrams each showing relation of a voltage applied to the ferroelectric capacitor with polarization and an induced capacitance.
Figure 4B:
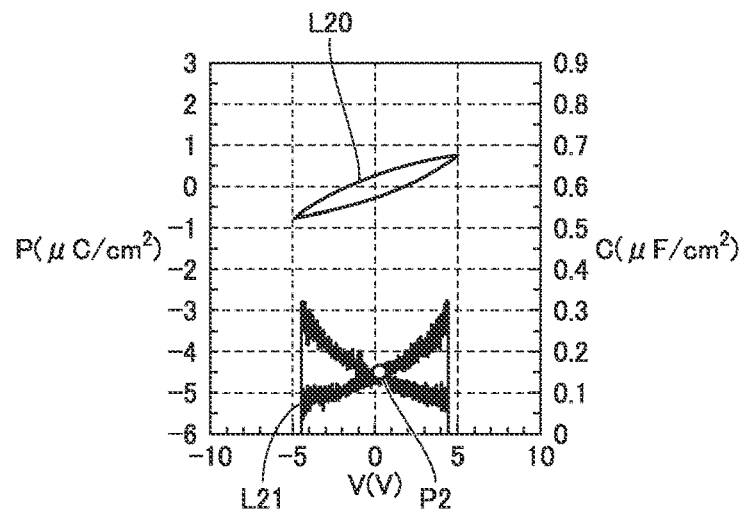
Figure 4C:
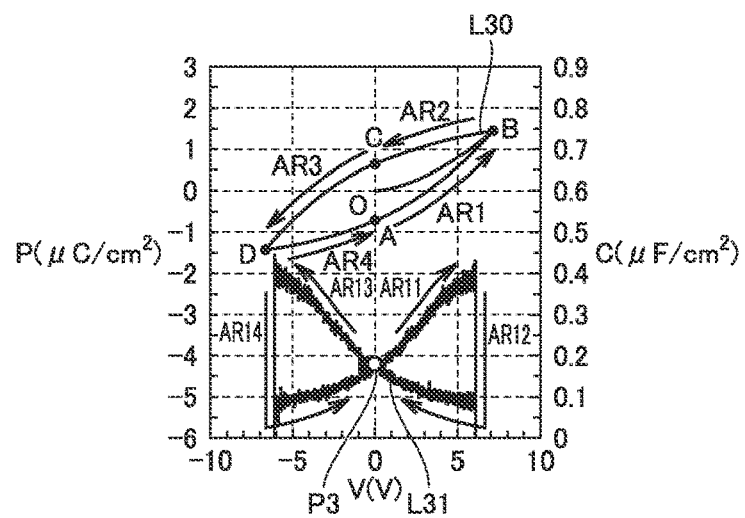
Figure 5:
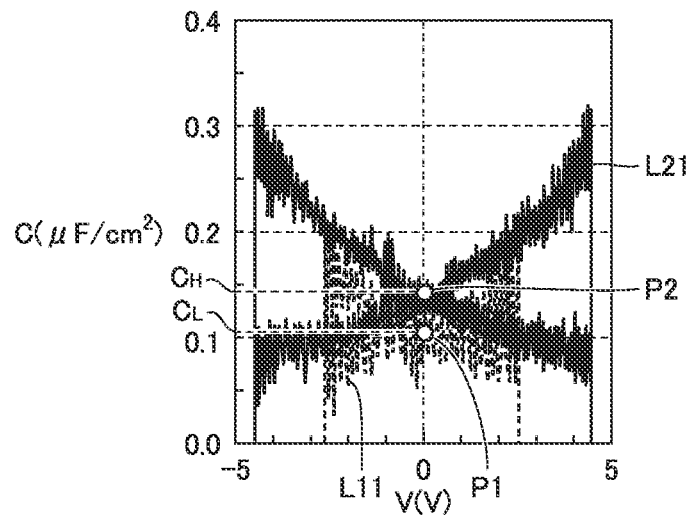
FIG. 5 is a diagram for illustrating a difference in residual capacitance caused by a voltage applied to the ferroelectric capacitor.

Characteristics of capacitor 111 will now be described with reference to FIGS. 4 and 5. FIGS. 4 and 5 are diagrams showing relation of an applied voltage with polarization and an induced capacitance when an evaluation sample of capacitor array 110 is manufactured and the applied voltage is varied. FIG. 5 is a diagram obtained by superimposing FIGS. 4A and 4B which will be described in detail below on each other.

A sample was employed as an evaluation sample, in which a film of Pt as a material for first electrode 114, a film of BLT having a thickness of 320 nm as ferroelectric layer 113, and a film of Au as a material for second electrode 112 are formed on a glass substrate, nine first electrodes 114 extending in the first direction are formed in parallel, and nine second electrodes 112 extending in the second direction are formed in parallel. Electrical characteristics of one capacitor 111 in the manufactured evaluation sample were evaluated by grounding first electrode 114, applying a voltage to second electrode 112, and using a semiconductor parameter analyzer.

FIG. 4A shows a value of polarization P and an induced capacitance C when a voltage applied to capacitor 111 was gradually increased from 0 V, the voltage was gradually lowered when the voltage reached +3 V, and the voltage was gradually increased to 0 V when the voltage reached −3 V. FIG. 4B shows an example in which the applied voltage was similarly varied within a range of ±5 V and FIG. 4C shows an example in which the applied voltage was similarly varied within a range of ±7 V. In each of FIGS. 4A to 4C, the abscissa represents an applied voltage V, the ordinate on the left represents polarization P, and the ordinate on the right represents induced capacitance C. FIGS. 4A to 4C show polarization P with lines L10, L20, and L30 and show induced capacitance C with lines L11, L21, and L31.

Variation in value of polarization P and a state of induced capacitance C with variation in applied voltage will be described with reference to the example in FIG. 4C. When a positive voltage is applied in an initial state (a point 0 in the figure) in which no polarization occurs in capacitor 111, with increase in applied voltage, polarization in a positive direction occurs, and when a voltage of +7 V is applied, a state shown with a point B is set. At this time, the induced capacitance also increases with increase in applied voltage.

When the applied voltage is gradually lowered from point B, polarization is lessened as shown with an arrow AR2 in the figure, and in a state that the applied voltage is zero, polarization on the positive side remains (a point C). At this time, the induced capacitance is abruptly lowered at timing of change from increase to lowering of the applied voltage, and thereafter gradually increased (an arrow AR12). Then, even when the applied voltage is set to zero, a residual capacitance shown with a point P3 in the figure is maintained.

When a negative voltage is applied from point C, polarization is further lessened (an arrow AR3), and when the applied voltage is set to −7 V, a state at a point D is set. At this time, the induced capacitance further increases from point P3 as shown with an arrow AR13.

When the applied voltage is gradually increased from point D, polarization increases as shown with an arrow AR4 in the figure, and in the state that the applied voltage is zero, polarization on the negative side remains (a point A). At this time, the induced capacitance is abruptly lowered at timing of change from lowering to increase of the applied voltage, and thereafter gradually increased (an arrow AR14). Then, in the state that the applied voltage is zero, a residual capacitance shown with point P3 in the figure is maintained.

When a positive voltage is applied from point A, polarization further increases (an arrow AR1), and when the applied voltage is set to +7 V, a state at point B is again set. The induced capacitance also further increases from point P3 with increase in applied voltage.

As shown in FIGS. 4A to 4C, polarization produced in ferroelectric layer 113 is varied as exhibiting hysteresis with increase and lowering in applied voltage, and magnitude of hysteresis also increases in accordance with magnitude of the applied voltage. Consequently, as the applied voltage is higher, the residual capacitance at the time when the applied voltage is set to zero also becomes high. For example, the residual capacitance at the time when ±3 V is applied (FIG. 4A) is approximately 0.10 $\mu F/cm^2$, the residual capacitance at the time when ±5 V is applied (FIG. 4B) is approximately 0.15 µF/cm², and the residual capacitance at the time when ±7 V is applied (FIG. 4C) is approximately 0.18 µF/cm².

Therefore, the capacitance of capacitor 111 with the applied voltage having been removed can be different by varying a voltage applied to capacitor 111 as in FIG. 5. Specifically, when a voltage of 5 V is applied to capacitor 111, the residual capacitance ($C_H$) is 0.15 µF/cm², and when a voltage of 3 V is applied, the residual capacitance ($C_L$) is 0.10 µF/cm². Therefore, since capacitor 111 can be set to two different states even in a zero-voltage state that the applied voltage has been removed, power consumption for storing the state is not necessary. When a voltage (for example, 0.5 V) at such a level as not producing polarization is applied, charges in accordance with a set capacitance are stored in capacitor 111. Therefore, by detecting the charges, a state set in capacitor 111 can be recognized.

In an example in which a ferroelectric capacitor is employed as a synapse device as described above, when voltages at the same level are applied to two electrode lines (that is, an example of a voltage applied to the synapse device =0), the capacitance of the capacitor is not varied. When voltages at different levels are applied to two electrode lines (that is, an example of a voltage applied to the synapse device ≠0), the capacitance of the capacitor is varied in accordance with the applied voltage. In other words, variation in state of the synapse device is defined by exclusive OR of voltages applied to electrode lines (that is, an output from the neuron circuit).

Figure 6:
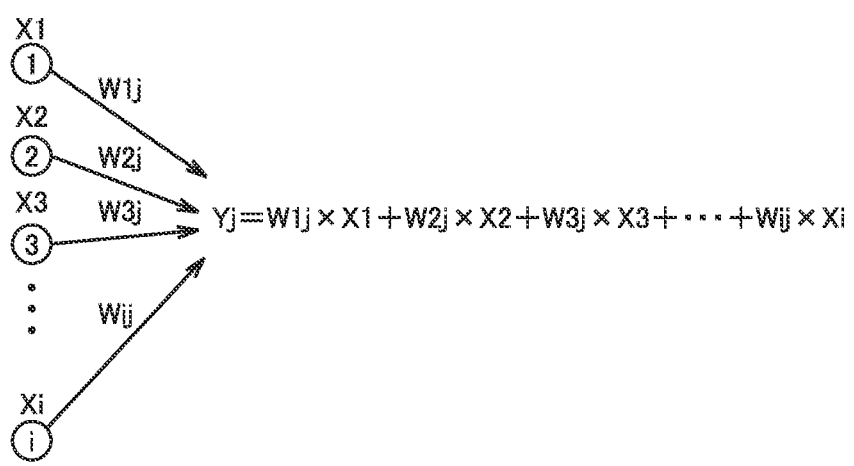
FIG. 6 is a schematic diagram of a single-layer perceptron which is one of neural networks.

In neural network 100 in the present embodiment shown in FIG. 1, the sum of charges determined by a voltage applied to each of first electrode lines X1 to Xi and a capacitance of the corresponding capacitor (synapse device) is provided from each of second electrode lines Y1 to Yj on a side of output terminal T2. Specifically, when Xi represents an output from neuron circuit 140 in an i-th row, Wij represents a coupling coefficient of the synapse device (ferroelectric capacitor) at an intersection between the first electrode line in the i-th row and the second electrode line in a j-th column, and Yj represents an output from the second electrode line in the j-th column, they can be expressed as a single-layer perceptron in FIG. 6.

$$Yj = W1j \times X1 + W2j \times X2 + \ldots + Wij \times Xi \quad (1)$$

In other words, output Yj from the second electrode line in the j-th column can be obtained as the sum calculated by weighting the output from neuron circuit 140 with the coupling coefficient of the synapse device. When it is assumed that Cij represents the residual capacitance of ferroelectric capacitor 111 that implements the synapse device at the intersection between the first electrode line in the i-th row and the second electrode line in the j-th column, coupling coefficient Wij and residual capacitance Cij are in proportion to each other. Therefore, in retrieval, when voltages applied to first electrode lines X1 to Xi are denoted as VX1 to VXi and charges provided from second electrode line Yj are denoted as Qoutj, the expression (1) above can be rewritten as below.

$$Qoutj = C1j \times VX1 + C2j \times VX2 + \ldots + Cij \times VXj \quad (2)$$

In retrieval, a value (Voutj) calculated by dividing charges Qoutj provided from second electrode line Yj by the sum of the capacitances (ΣC=C1j+C2j+ . . . Cij) is fed back to neuron circuit 140.

$$Voutj = Qoutj/\Sigma C \quad (3)$$

A High or Low signal is provided from neuron circuit 140 based on comparison between fed back Voutj and a prescribed threshold value. An error of a provided signal is thus corrected.

Training and Retrieval in Neural Network

Details of an approach to training and retrieval in neural network 100 will now be described with reference to FIGS. 7 to 10. FIGS. 7 to 10 illustrate an example of three-row and two-column capacitor array 110 formed from three first electrode lines X1 to X3 and two second electrode lines Y1 and Y2 for facilitating description. Though FIGS. 7 to 10 show an example in which second electrode line Y1 is connected to first electrode line X1 and second electrode line Y2 is connected to first electrode line X2 in direction control circuit 120, each second electrode line may also be connected to another first electrode line.

FIG. 7 (FIGS. 7A and 7B) shows an initial state before training of neural network 100, and no residual capacitance is produced in each capacitor in capacitor array 110. In this case, no voltage is applied from direction control circuits 120 and 130 to each electrode line either.

Figures 8A, 8B:
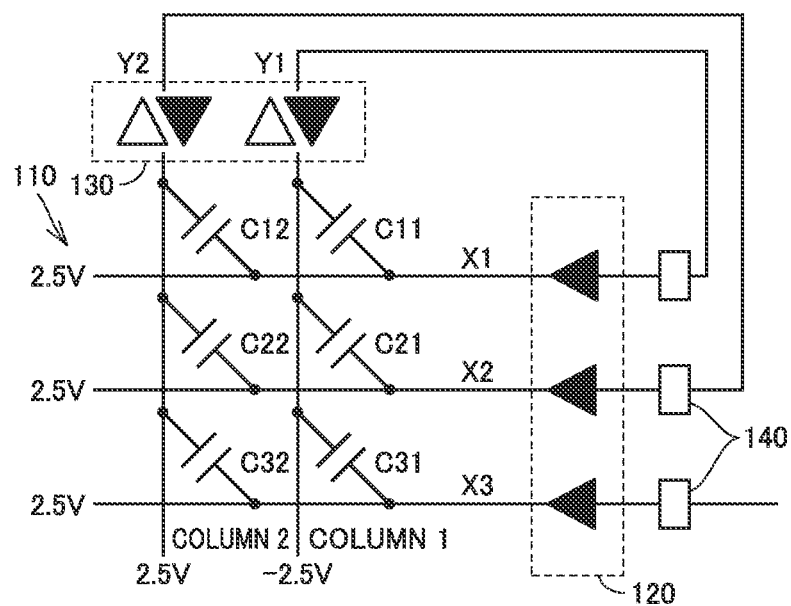
FIGS. 8A and 8B are a second diagram for illustrating an approach to training and retrieval in the neural network in FIG. 1.

FIG. 8 (FIGS. 8A and 8B) shows an example in which a High state is stored in three synapse devices connected to second electrode line Y1 in the first column. In this case, direction control circuit 120 applies a voltage, for example, of 2.5 V to each of first electrode lines X1 to X3. On the other hand, direction control circuit 130 applies a voltage of −2.5 V to second electrode line Y1 and applies a voltage of 2.5 V to second electrode line Y2 while capacitor array 110 and output terminals T2 are not connected to each other.

Then, a voltage across terminals (first voltage) of 5 V is applied across opposing ends of each of the capacitors formed between second electrode line Y1 and the first electrode lines. Thus, as described with reference to FIG. 5, residual capacitances C11, C21, and C31 in the capacitors formed by second electrode line Y1 are in the $C_H$ state. On the other hand, second electrode line Y2 in the second column and each first electrode line are at potentials equal to each other, and hence no voltage is applied to the capacitor formed between these electrode lines. Therefore, no residual capacitance is produced in the capacitors formed by second electrode line Y2 in the second column.

FIG. 9 (FIGS. 9A and 9B) shows an example in which a Low state is stored in three synapse devices connected to second electrode line Y2 in the second column. In this case, direction control circuit 120 applies a voltage, for example, of 1.25 V to each of first electrode lines X1 to X3. On the other hand, direction control circuit 130 applies a voltage of 1.25 V to second electrode line Y1 and applies a voltage of −1.25 V to second electrode line Y2 while capacitor array 110 and output terminals T2 are not connected to each other.

Then, a voltage across terminals (second voltage) of 2.5 V is applied across opposing ends of each of the capacitors formed between second electrode line Y2 and the first electrode lines. Thus, as described with reference to FIG. 5, residual capacitances C12, C22, and C32 in the capacitors formed by second electrode line Y2 are in the $C_L$ state. On the other hand, second electrode line Y1 in the first column and each first electrode line are at potentials equal to each other, and hence no voltage is applied to the capacitors formed between these electrode lines. Therefore, the residual capacitances in the capacitors formed by second electrode line Y1 in the first column are maintained at CH.

Though FIGS. 8 and 9 illustrate the example in which the same state of the residual capacitances of the capacitors in each column is stored, the states of the capacitors in the same column may individually be stored. For example, when residual capacitances C11 and C31 are in the CH state and residual capacitance C21 is in the CL state, initially, a voltage of 2.5 V is applied to first electrode lines X1 and X3 and a voltage of −2.5 V is applied to first electrode line X2, and voltage of −2.5 V is applied to second electrode line Y1. Then, a potential difference of 5 V is produced between first electrode line X1 and second electrode line Y1 and between first electrode line X3 and second electrode line Y1, and first electrode line X2 and second electrode line Y1 are at the same potential. Residual capacitances C11 and C31 are thus in the CH state.

Thereafter, a voltage of −1.25 V is applied to first electrode lines X1 and X3 and a voltage of 1.25 V is applied to first electrode line X2, and a voltage of −1.25 V is applied to second electrode line Y1. Since first electrode line X1 and second electrode line Y1 are thus at the same potential and first electrode line X3 and second electrode line Y1 are at the same potential, the CH state of residual capacitances C11 and C31 is maintained. Since the potential difference of 2.5 V is produced between first electrode line X2 and second electrode line Y1, residual capacitance C21 is in the CL state.

By thus controlling direction control circuits 120 and 130, selecting electrode lines that form a synapse device (capacitor) to be trained, and applying a desired voltage across the electrode lines, the target synapse device can individually be trained. Polarity of a voltage to be applied to the electrode line may be reverse to the above.

Figure 10:
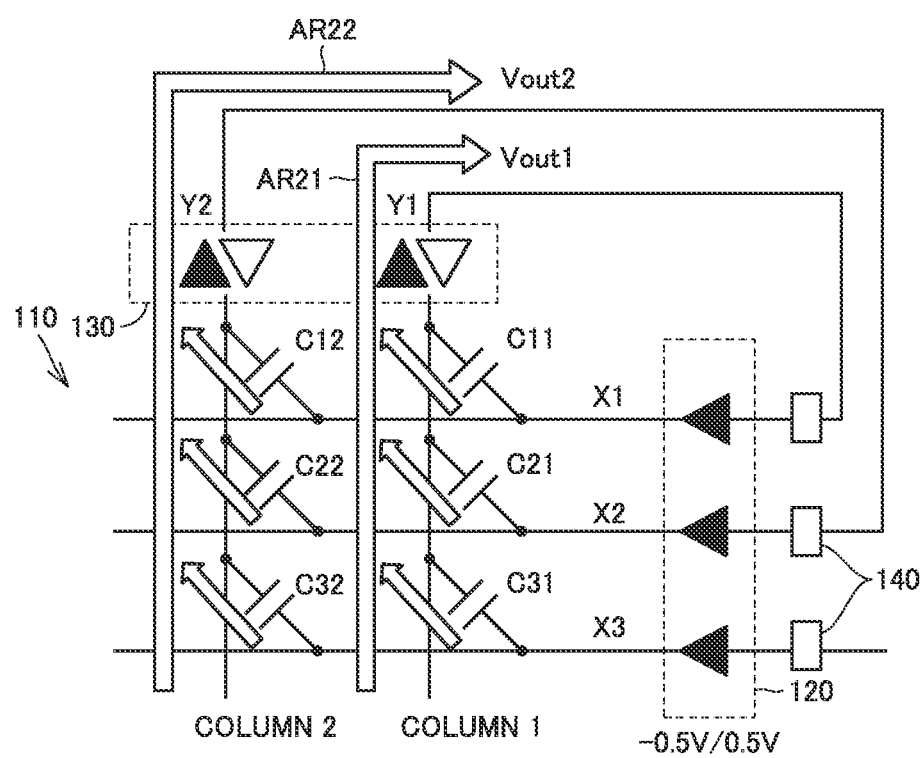
FIG. 10 is a fourth diagram for illustrating an approach to training and retrieval in the neural network in FIG. 1.

Exemplary retrieval by using a state stored by training will now be described with reference to FIG. 10. In retrieval, direction control circuit 130 does not apply a voltage to second electrode lines Y1 and Y2.

On the other hand, direction control circuit 120 applies a voltage (a third voltage) at a level at which the residual capacitance of each capacitor is not varied, to first electrode lines X1 to X3 in accordance with an output from neuron circuit 140 corresponding to a signal provided to input terminal T1. For example, when an output from neuron circuit 140 is High, direction control circuit 120 applies a voltage of 0.5 V to the first electrode lines, and when an output from neuron circuit 140 is Low, it applies a voltage of −0.5 V to the first electrode lines.

When voltages applied to first electrode lines X1 to X3 are denoted as VX1 to VX3, respectively, charges Qout1 and Qout2 that appear in second electrode lines Y1 and Y2 are expressed in expressions (4) and (5) below, respectively.

$$Qout1 = C11 \times VX1 + C21 \times VX2 + C31 \times VX3 \quad (4)$$

$$Qout2 = C12 \times VX1 + C22 \times VX2 + C32 \times VX3 \quad (5)$$

Voltages Vout1 and Vout2 obtained by dividing charges Qout1 and Qout2 by the sum of the residual capacitances of the capacitors corresponding to the second electrode lines are provided from output terminals T2. Voltages Vout1 and Vout2 are expressed in expressions (6) and (7) below.

$$Vout1 = Qout1/(C11 + C21 + C31) \quad (6)$$

$$Vout2 = Qout2/(C12 + C22 + C32) \quad (7)$$

In retrieval, voltages Vout1 and Vout2 shown in the expressions (6) and (7) are fed back to corresponding neuron circuits 140 as shown with arrows AR21 and AR22. Neuron circuits 140 determine output values based on comparison between fed back voltages Vout1 and Vout2 and a prescribed threshold value, and apply voltages to the first electrode lines based on the output values. For example, when a voltage of the fed back signal is higher than a threshold value while an output from neuron circuit 140 in response to the input signal is Low, an output from neuron circuit 140 is switched to High. Though not shown, in feedback, input terminal T1 and neuron circuit 140 are not connected to each other.

As described above, in the neural network in the present embodiment, a ferroelectric capacitor that uses capacitive coupling is employed as the synapse device. A residual capacitance of the ferroelectric capacitor is varied in accordance with an applied voltage, and the residual capacitance is used as a coupling coefficient in the synapse device. Therefore, it is not necessary to steadily feed a current to the synapse device for training and retrieval of data as in the conventional configuration in which the synapse device is formed from a variable resistance element. Therefore, even when the number of synapse devices increases for high integration, a state of storage can be held with extremely low power consumption. Consequently, power consumption in the neural network can be reduced.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A neural network comprising:
   first electrode lines in parallel;
   second electrode lines that extend in a direction different from the first electrode lines;
   a ferroelectric layer arranged between the first electrode lines and the second electrode lines;
   neuron circuits provided in the first electrode lines, respectively;
   a first direction control circuit connected between the neuron circuits and the first electrode lines; and
   a second direction control circuit connected between the neuron circuits and the second electrode lines, wherein the first electrode lines and the second electrode lines are capacitively coupled to form synapse devices at intersections in a plan view, each of the intersections being a portion where a first electrode line and a second electrode line intersect with each other.

2. The neural network according to claim 1, being capable of training a provided signal and retrieving a trained signal, wherein
   each of the neuron circuits is configured to provide a signal in a first state or a second state in accordance with an input, and in training, the first direction control circuit and the second direction control circuit set capacitances of the synapse devices by applying to the first electrode lines and the second electrode lines, voltages different in accordance with states of output signals from the neuron circuits.

3. The neural network according to claim 2, wherein the ferroelectric layer contains bismuth lanthanum titanate, lead zirconate titanate, or barium titanate.

4. The neural network according to claim 2, wherein
in retrieval,
the first direction control circuit applies a voltage lower than in training to the first electrode lines in accordance with an input signal, and
the second electrode lines provide voltages weighted in accordance with the capacitances of the synapse devices set in training.

5. The neural network according to claim 4, wherein the ferroelectric layer contains bismuth lanthanum titanate, lead zirconate titanate, or barium titanate.

6. The neural network according to claim 4, wherein
in training, the first direction control circuit and the second direction control circuit
  apply, when outputs from the neuron circuits are in the first state, a voltage to the first electrode lines and the second electrode lines so as to apply a first voltage to the synapse devices, and
  apply, when outputs from the neuron circuits are in the second state, a voltage to the first electrode lines and the second electrode lines so as to apply a second voltage lower than the first voltage to the synapse devices, and
in the synapse devices, a capacitance when the first voltage is applied is different from a capacitance when the second voltage is applied.

7. The neural network according to claim 6, wherein
in retrieval, the first direction control circuit applies a third voltage lower than the first voltage and the second voltage to the first electrode lines.

8. The neural network according to claim 6, wherein the ferroelectric layer contains bismuth lanthanum titanate, lead zirconate titanate, or barium titanate.

9. The neural network according to claim 7, wherein the third voltage has a voltage value at a level at which the capacitances of the synapse devices are not varied.

10. The neural network according to claim 7, wherein the ferroelectric layer contains bismuth lanthanum titanate, lead zirconate titanate, or barium titanate.

11. The neural network according to claim 9, wherein the ferroelectric layer contains bismuth lanthanum titanate, lead zirconate titanate, or barium titanate.

12. The neural network according to claim 1, wherein
each of the first electrode lines is formed of platinum or silicide of platinum, and
each of the second electrode lines is formed of gold or silicide of gold.

13. The neural network according to claim 12, wherein the ferroelectric layer contains bismuth lanthanum titanate, lead zirconate titanate, or barium titanate.

14. The neural network according to claim 1, wherein
each of the first electrode lines is formed of gold or silicide of gold, and
each of the second electrode lines is formed of platinum or silicide of platinum.

15. The neural network according to claim 1, wherein the ferroelectric layer contains bismuth lanthanum titanate, lead zirconate titanate, or barium titanate.

16. The neural network according to claim 14, wherein the ferroelectric layer contains bismuth lanthanum titanate, lead zirconate titanate, or barium titanate.

* * * * *